April 26, 1949.  R. A. MARKHAM  2,468,218
LIQUID MEASURING GAUGE
Filed Oct. 18, 1946
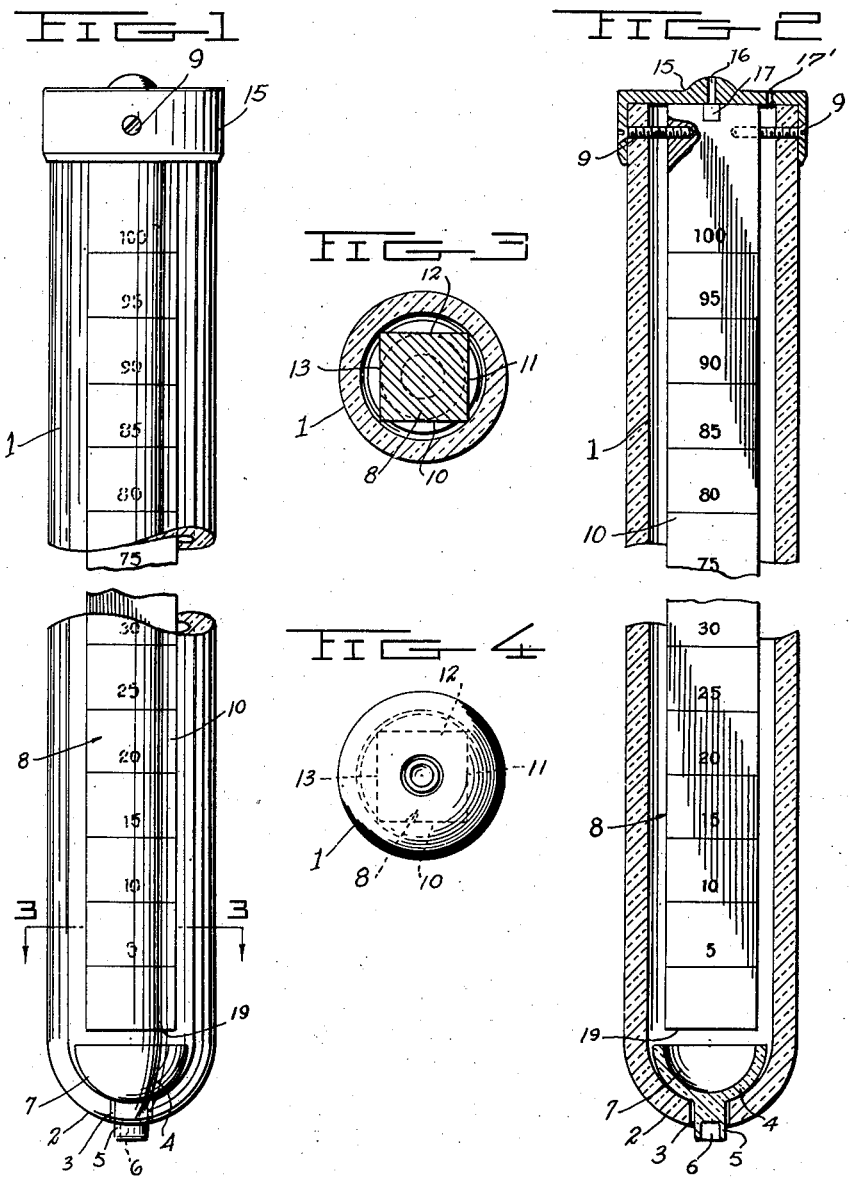
Inventor
Roy A. Markham,
By McMorrow, Berman & Davidson
Attorneys Patented Apr. 26, 1949

2,468,218

UNITED STATES PATENT OFFICE 2,468,218

LIQUID MEASURING GAUGE

Roy A. Markham, Aberdeen, Wash.

Application October 18, 1946, Serial No. 704,260

1 Claim. (Cl. 33—126.4)

This invention relates to a gauge, and more particularly to an instrument of the type referred to for measuring the amounts of liquid, such as gasoline or light oil, held in containers of different sizes or types.

The chief object of the invention is to provide a gauge formed of transparent material, having an interior scale, and provided with a valve automatically operated by engagement with the bottom of a tank or other receptacle when the gauge is lowered therein to obtain the exact depth of the liquid held in such a container.

Another object of the invention is to provide a gauge of simple design and rugged construction having but one moving part.

A further object of the invention is to provide a gauge which is adapted for use with containers of different sizes or shapes, whereby the amounts of liquid in various containers can be accurately measured with a single instrument.

The above and other objects of the invention are accomplished by the provision of the hereinafter described gauge comprising, briefly stated, a transparent tube having an internal scale and provided with an automatically operated valve at its lower end.

The invention will best be understood from the following description of the same, taken in conjunction with the accompanying drawings, in which:

Figure 1 is a front elevational view of the gauge;

Figure 2 is a vertical cross-section of the same;

Figure 3 is a sectional view taken along the line 3—3 of Figure 1, looking in the direction indicated by the arrows, and Figure 4 is a top plan view of the gauge.

Referring to the drawings in greater detail, I indicates the body of the gauge, which takes the form of a transparent tube, which may be of any convenient length selected in accordance with the particular type of container with which the gauge is adapted for use. The tube may be constructed of any suitable transparent material such as glass, but is preferably made of a transparent plastic such as Lucite or other transparent plastic whose physical properties are such as will give the tube sufficient strength and rigidity to serve the purpose for which it is designed.

The body I of the gauge is preferably formed with a rounded bottom 2 having an aperture 3 adapted to be closed by a valve 4. As can readily be seen from an inspection of Figures 1 and 2, the valve 4 is formed with an extension 5 of somewhat smaller diameter than the aperture 3, and of sufficient length to extend beyond the rounded bottom 2 of the transparent tube. The extension 5 of the valve 4 may have a recess 6 formed in its lower end for a purpose later to be made apparent. The valve 4 is formed with a cup-shaped portion 7 inside the bottom of the transparent tube, which cup-shaped portion is of slightly smaller diameter than the inside diameter of the tube, and opens upwardly.

Within the transparent tube I and spaced somewhat from its inner wall, a scale-bearing member 8 is positioned. This scale-bearing member extends from the top of the gauge to a point spaced somewhat above the top of the valve 4, and is preferably secured in place by means of screws 9 inserted through the wall of the transparent tube near the top. The scale-bearing member is preferably polygonal in cross-section, as indicated in Figure 3, and bears on its vertical surfaces scales of various types in accordance with the particular types of containers with which the gauge is adapted to be used. The particular kinds of graduations employed on the scales may, of course, be predetermined to conform to the particular conditions prevailing, and may indicate any desired factor, such as the level of the liquid in feet, inches or any other suitable unit above the bottom of the containers, or they may indicate in percentages the proportion of the total contents of the tank which they contain at any particular time. Any suitable graduations by which the contents of a tank can be gauged can, of course, be employed in marking off the scales.

As seen in the drawings, the scale-bearing member 8 has four vertical sides 10, 11, 12 and 13, all of which may be provided with a different scale with appropriate graduations for indicating the amounts of liquid contained in as many different sizes or shapes of tanks. The scale-bearing member may, of course, have any number of sides, and may be formed as a solid rod or in the form of a hollow or tubular element.

A cap member 15 fits over the upper end of the transparent tube I and is secured thereto by the screws 9. This cap member is provided with a centrally disposed aperture 16 through which a rod, not shown, is adapted to pass. The rod preferably has an enlarged head within the top of the transparent tube which fits into a recess 17 in the upper end of the scale-bearing member. The rod may be of any suitable length, and by this means the gauge may be lowered through an opening in a tank to determine the amount of liquid contained therein. The cap 15 has an air vent 17', so that the liquid may enter and be drained from the tube 1, as stated.

As will be seen in Figures 1 and 2, the scale-bearing member terminates at its lower end 19 at a point sufficiently spaced above the valve 4 to prevent any interference with the free operation of the valve.

In the operation of the above-described gauge, the same is lowered through a suitable opening in the top of a tank until the extension 6 on the valve 4 comes into engagement with the bottom of the tank. The valve 4 will then be immediately unseated and the liquid in the tank will rise to its own level inside the transparent tube 1.

Immediately upon lifting the gauge from the bottom of the tank, in removing the gauge, the valve 4 will fall to closed position, and due to the weight of the liquid above it, will remain securely closed, thus retaining the liquid therein at the same height as the level of the liquid in the tank above the bottom of the tank. After the gauge has been read, which can easily be accomplished due to the transparency of the tube 1, the liquid can be released by opening the valve 4, and the gauge will then be in condition for further use.

Due to the fact that the space between the scale-bearing member 8 and the inner wall of the transparent tube can be reduced to any desired degree, the gauge can be employed with highly colored liquids through which it would otherwise be difficult to read an enclosed scale. Moreover, since the corners of the scale-bearing member are always closer to the inner wall of the transparent tube than are other portions of the vertical surfaces, a single gauge of this character can be used with a variety of liquids varying greatly in color, and it will always be possible to read the scale graduations through the various liquids with which the gauge may be employed.

By constructing the various parts of the gauge of plastic material, a durable and rugged structure is obtained, capable of withstanding long wear and the rough usage to which such an instrument is customarily subjected. When the valve 4 is also constructed of plastic material, the same may have a tendency to float when used with liquids of high density, but this serves only to assure the quick opening of the valve upon insertion of the gauge in a tank of liquid, and in no way affects the secure closing of the valve when it is removed from the liquid.

The valve 4 may, of course, be formed of some heavier material, and in this case the recess 6 provided in the lower end of the extension 5 of the valve forms an air pocket which has a tendency to assist the opening of the valve upon insertion of the gauge into a liquid.

It will thus be seen that the invention, as described above, provides a gauge of simple design, having few parts and forming in a single instrument a means for conveniently measuring the amounts of liquids of all kinds contained in tanks of various sizes and shapes.

It will be understood, of course, that the above-described embodiment of the invention is intended by way of illustration only, and that many changes in the details of construction of the same can be made without departing from the spirit of the invention or the scope of the appended claim.

Having thus clearly shown and described the invention, what is claimed as new and desired to be secured by Letters Patent is:

A cylindrical transparent tube having its upper end open and its lower end closed, the closed end having an aperture formed therein, a downwardly seating valve disposed within the tube adjacent to the closed end to cover the aperture and having a stem extending through the aperture and projecting below the closed end, a cap mounted upon the open end of the tube and having a depending flange to receive such end, and a bar formed square in cross section and arranged within the tube and secured to the flange, said bar having flat faces and corners which substantially contact with the inner face of the tube, at least one flat face having a scale graduated to measure liquid units, the flat face being disposed close to the inner face of the transparent tube for forming a thin passage for receiving the liquid, the thin passage rendering the scale visible through the liquid.

ROY A. MARKHAM.

REFERENCES CITED

The following references are of record in the file of this patent:

UNITED STATES PATENTS

| Number | Name | Date |
|---|---|---|
| 980,320 | Millea et al. | Jan. 3, 1911 |
| 1,423,156 | Schmitt | July 18, 1922 |